J. GIBLIN.
Saw-Attachments.
No. 140,495. Patented July 1, 1873.
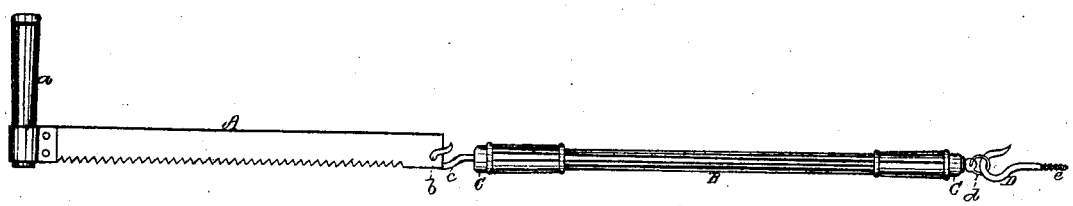
Witnesses
S. N. Piper.
L. N. Möller.
John Giblin.
by his attorney
R. H. Eddy

UNITED STATES PATENT OFFICE.

JOHN GIBLIN, OF BOSTON, ASSIGNOR TO HIMSELF AND HIRAM K. HINES, OF EAST BOSTON, MASSACHUSETTS.

IMPROVEMENT IN SAW ATTACHMENTS.

Specification forming part of Letters Patent No. 140,495, dated July 1, 1873; application filed May 7, 1873.

*To all whom it may concern:*

Be it known that I, JOHN GIBLIN, of Boston, of the county of Suffolk and State of Massachusetts, have invented a new and useful Improvement in Saw Attachment for Pile-Saws; and do hereby declare the same to be fully described in the following specification, and represented in the accompanying drawing, which denotes a side elevation of a saw with my said attachment.

In using saws for cutting off trees or piles in trenches, at low water, two men at the handles have been usually employed, each alternately pushing and pulling the saw. The holding of the saw and its motions being governed by two separate individuals it is liable to be more or less twisted or bent and turned out of its proper course, and thereby be caused to bind in the pile and operate with much friction.

With my elastic attachment the saw is under control of, and is operated by, one person only, who has simply to pull it toward him, its advance in the opposite direction being due to the elastic force generated in the attachment under the back pull of the saw, and such attachment enables the operative to turn or direct the saw as he may please in order to properly present it to the pile, and cut through it in the desired direction.

In the drawing, A denotes a pile or band saw, provided with one handle, $a$, fixed to one end of the blade, and arranged with the said blade in manner as represented. At or near its opposite end the blade has a hole, $b$, through it to receive the hook $c$ of the elastic attachment. The said elastic attachment consists of a spring or band, B, of vulcanized caoutchouc, provided at one end with a hook, $c$, and at the other with an eye or ring, $d$.

In making the said attachment I prefer to have the band tubular for a short distance from each end, if not throughout its length; and to insert it at each end into the lower end of one of two tapering tubes, C C, and to expand the rubber into the tube by a conical wedge driven into the tube and rubber, the outer ends of the tubes being plugged, and having the hook and eye duly connected with them. In order to connect the eye with a pile or other support I make use of a hook, D, as shown, provided with a screw, $e$, upon its shank.

In using the saw with its elastic attachment the hook is first to be inserted in a neighboring pile, or some other suitable fixture, at the requisite distance from the pile or article to be sawed. Such distance should be a little less than the length of the saw and the attachment. On drawing back the saw lengthwise the requisite extent the attachment will give way or stretch accordingly, and will next return the saw or impart to it a counter movement on its being relieved from the back draft upon it.

The attachment admits of the saw being freely turned laterally as occasion may require, whether in first applying it to, or afterward to adjust it to, its work.

I make no claim to a scroll-saw having a spring applied to it, as shown in the United States Patent No. 100,551, my invention having no reference to saws with mechanism for automatically operating them in opposite directions, a handle to be grasped by the hand of the person who may work the saw being a distinctive feature of a pile-saw, to be worked by manual power applied to such handle. A pile-saw of the kind represented, provided with a retractive spring, and a means of attaching the free end of such spring to a pile or other body, I believe to be a new article for the use of pile-drivers.

I claim—

As a new manufacture, the elastic band or spring B, the connections $c\ d$, the saw A, and handle $a$, combined and arranged substantially in manner and to operate as described, the whole constituting an automatic and manual power apparatus or mechanism for cutting off piles, as specified.

JOHN GIBLIN.

Witnesses:
R. H. EDDY,
J. R. SNOW.